Oct. 30, 1962  R. J. STEVENS  3,061,806
RESISTANCE THERMOMETER
Filed July 26, 1960  2 Sheets-Sheet 1
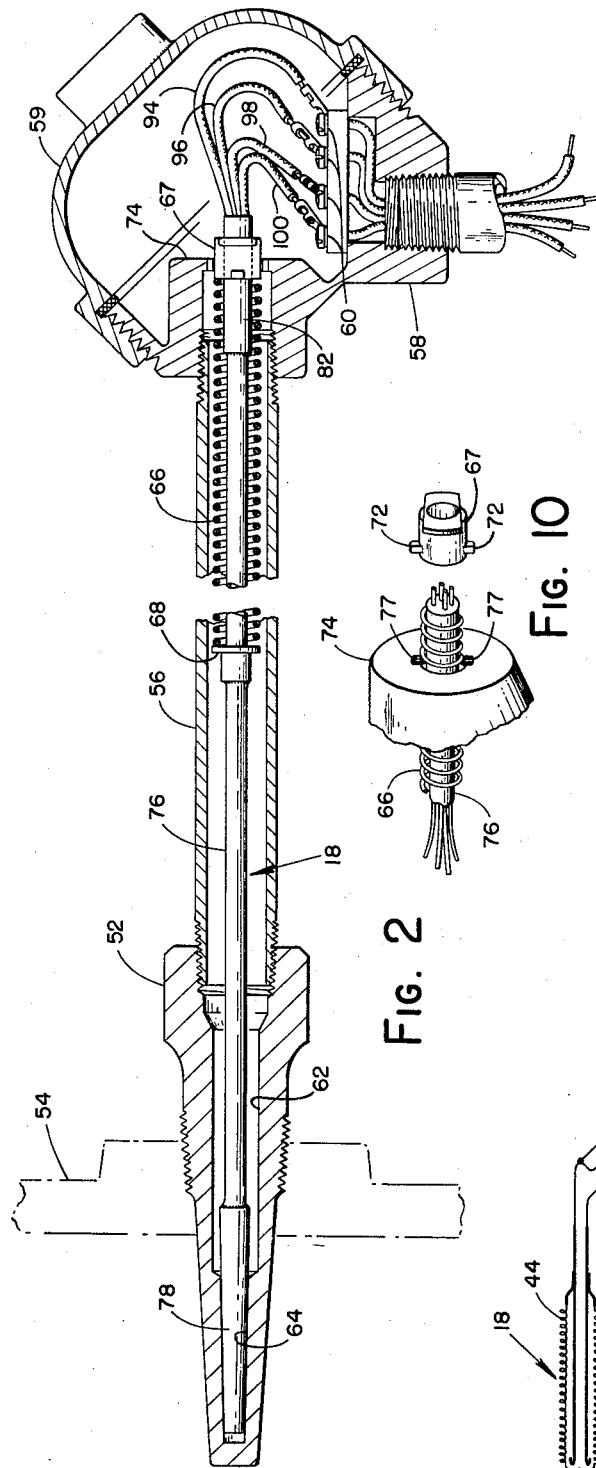
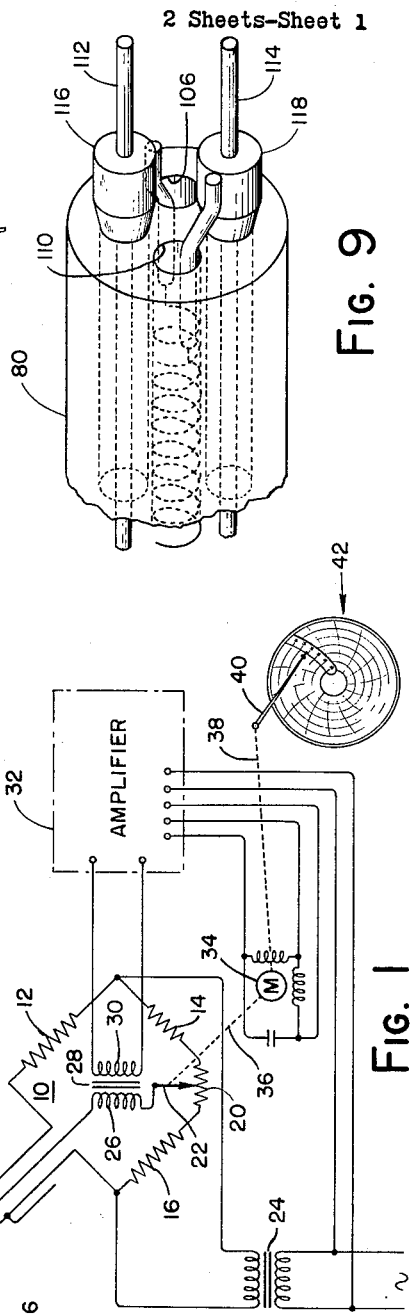
INVENTOR.
ROBERT J. STEVENS
BY
John F. Luhrs
ATTORNEY Oct. 30, 1962
R. J. STEVENS
3,061,806
RESISTANCE THERMOMETER
Filed July 26, 1960
2 Sheets-Sheet 2
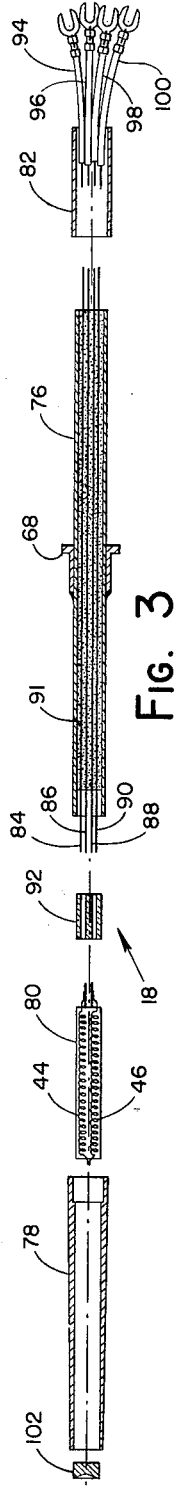
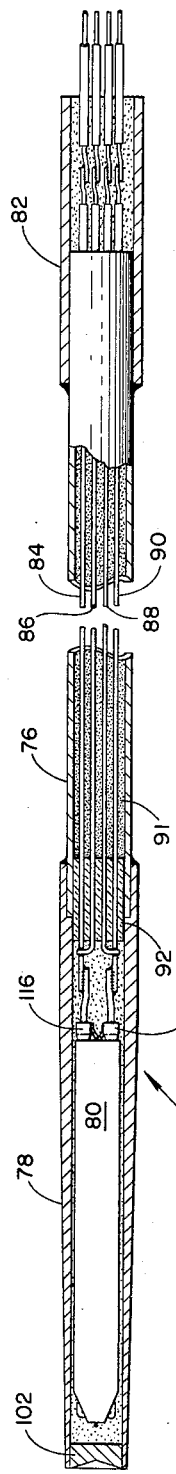
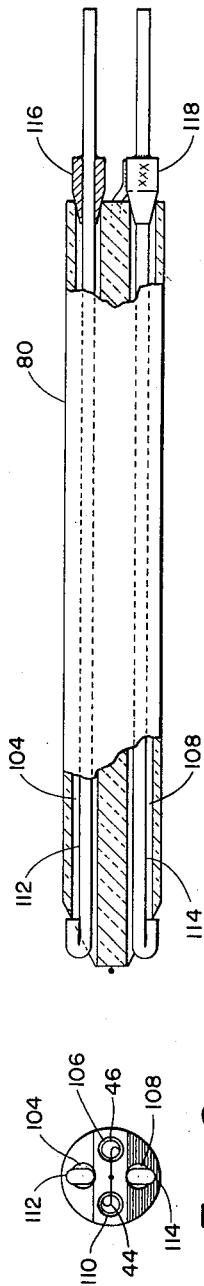
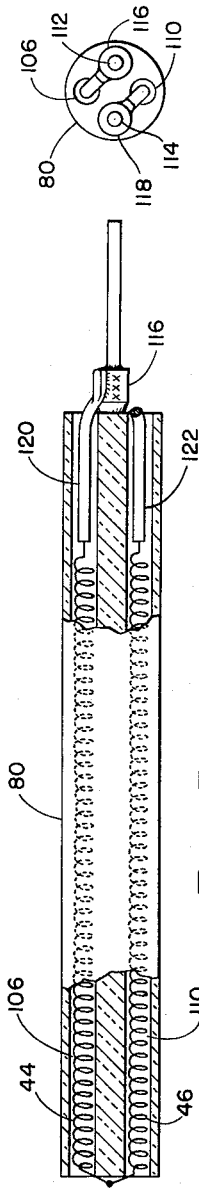
INVENTOR.
ROBERT J. STEVENS
BY
ATTORNEY

United States Patent Office 3,061,806
Patented Oct. 30, 1962

3,061,806
RESISTANCE THERMOMETER
Robert J. Stevens, Mentor, Ohio, assignor to Bailey
Meter Company, a corporation of Delaware
Filed July 26, 1960, Ser. No. 45,337
2 Claims. (Cl. 338—28)

This invention relates to temperature measuring apparatus and more particularly to the construction and method of manufacture of a sealed resistance thermometer particularly adapted for measuring high temperatures.

In the usual resistance thermometer a temperature responsive resistance element is positioned in a metal casing or sheath which in turn may be positioned in a protective well subjected to the temperature which is to be measured. Many problems are encountered in the design of such a thermometer. One problem is that electrical insulation of the resistance element and leadwires is required. The more common electrical insulating materials are unsatisfactory at extremely high temperatures due to their tendency to melt and deform. For this reason it is necessary to employ as insulators ceramic materials or certain metal oxides which are capable of withstanding extremely high temperature conditions.

Insulating materials satisfactory for high temperatures use are of relatively high hardness, and in many instances due to the lack of resiliency of the insulator, a stress or strain is created on the resistance element which in the case of fine wire resistance elements often causes breakage or at least a decrease in the accuracy of the temperature measurement. Mere expansion and contraction of the wire with temperature variations is often sufficient to create such stress or strain. Also, such a stress may be created as a result of mechanical vibration of the well or sheath of the thermometer unit.

In attempts to eliminate the disadvantages of ceramic and other materials as insulators due to the hardness thereof, powdered oxide materials such as aluminum or magnesium oxide have been packed around the resistance element and leadwires. While the insulation produced by this method substantially eliminates the hardness problem discussed above, the difficulty of manufacturing such a thermometer has limited the use of such insulation. In the case of a resistance element comprising a wire helix it is difficult to adequately pack the powder around the resistance element without damaging the fine resistance wire. One method of manufacture comprises the positioning of the wire resistance element in a metal tube filled with an oxide powder and then swaging the tube to obtain the necessary degree of compactness of the powdered material. This method often results in breakage or creation of undue stresses on the resistance element during the swaging operation and has been a generally unsatisfactory manufacturing process. Another substantial disadvantage of packing the powdered insulating material through swaging of the tube is the fact that only one wire resistance element can be positioned in the tube substantially limiting the maximum obtainable response of the thermometer unit.

It is a principal object of this invention to provide a resistance thermometer unit incorporating insulators of both the hard ceramic type of material and also the powdered material to achieve maximum durability, response, and ease of manufacture.

Another object of the invention is to provide a resistance thermometer unit having a plurality of wire resistance elements occupying minimum space and novelly insulated.

Another object of the invention is to prevent the creation of stresses or strains in the resistance wire of a resistance thermometer unit due to temperature variations or mechanical vibrations.

A further object of the invention is to provide an improved method of manufacturing a resistance thermometer unit.

Other objects and advantages will become apparent from the following description taken in connection with the accompanying drawing wherein:

FIG. 1 is a schematic illustration of an electric circuit utilizing a resistance thermometer embodying the invention;

FIG. 2 is a sectional view illustrating the mounting of the thermometer unit in a protective well;

FIG. 3 is an exploded sectional view of the parts of the resistance thermometer unit;

FIG. 4 is a longitudinal view in partial section of the resistance thermometer unit;

FIGS. 5 and 6 are enlarged longitudinal views in partial section taken at right angles to each other of a part illustrated in FIGS. 2, 3 and 4;

FIGS. 7 and 8 are oppositely taken end views of the part illustrated in FIGS. 5 and 6;

FIG. 9 is a perspective view of a portion of the part illustrated in FIGS. 5, 6, 7 and 8; and FIG. 10 is an exploded perspective view of several parts illustrated in FIG. 2.

Referring more particularly to FIG. 1 of the drawings, there is shown schematically an electric circuit including a Wheatstone bridge 10 having fixed resistance arms 12, 14 and 16, a fourth variable resistance arm 18 formed by a resistance thermometer unit embodying this invention, and an adjustable balancing potentiometer resistance 20 provided with a movable contact arm 22.

The bridge 10 is energized in a conventional manner from an A.-C. source comprising a supply transformer 24 coupled to a supply line. The primary winding 26 of a bridge output transformer 28 is connected across the bridge 10 conjugate conductors opposite the connections from the bridge supply transformer 24. The secondary winding 30 on the transformer 28 is connected to the input of an amplifier and motor control circuit 32 which controls the speed and direction of rotation of an electric motor 34 in accordance with the magnitude and direction of unbalance of the bridge circuit 10. The motor 34 through linkage 36 positions the contact arm 22 to balance the bridge 10 and through linkage 38 positions the pen 40 of a recording instrument 42 to provide a continuous record of the variable temperature measured.

In operation of the basic circuit described above and illustrated in FIG. 1, the resistance thermometer unit 18 will undergo a variation in resistance in response to a variation in temperature thereof causing a condition of bridge unbalance the magnitude of which is proportional to the temperature of unit 18. The circuit 32 is responsive to the unbalance voltage produced across primary winding 26 to effect rotation of motor 34 and positioning of contact arm 22 in a direction to restore bridge balance. Pen 40 will be simultanteously positioned to manifest the temperature measured.

Referring now to the novel construction of the resistance thermometer unit 18, as indicated schematically in FIG. 1 of the drawings this arm of the bridge circuit is formed by two serially connected helical resistance elements 44 and 46 which may be formed by winding on a mandrel or other suitable method. The wire resistance elements 44 and 46 are formed from material such as platinum which will undergo a resistance variation in response to a change in temperature and which has a resistance which is substantially linear with temperature over the ranges of temperature encountered.

Referring now to FIG. 2 of the drawings, the entire thermometer unit 18 is of tubular configuration and provided with a tapered surface at one end thereof. The casing of the unit 18 is adapted to be received by a protective well 52 which as illustrated in FIG. 2 may be suitably threaded in the wall of a conduit 54 to be subjected to the temperature of the fluid therein.

A pipe nipple 56 has one end threaded in the outer end of the well 52 and has a terminal head 58 threaded on the other end thereof. The terminal head 58 is provided with terminal screws 60 which are connected by suitable leadwire to the various internal circuit elements of the thermometer element 18 and connected by suitable conductors to the bridge circuit 10. The head 58 is provided with a removable cap 59 to permit access to the terminals 60 and thermometer 18.

The well 52 is provided with an axial bore 62 having a lower tapered surface 64 complemental to the tapered surface of the unit 18. The thermometer unit 18 extends through the pipe nipple 56 having its tapered surface seated on the surface 64. Seating pressure sufficient to insure good thermal contact between the two tapered surfaces is established by a coil spring 66 mounted in compression between a releasable spring retainer 67 and a spring retainer 68 formed on the thermometer unit 18. The right end of the unit 18 extends into the terminal head 58 and terminates adjacent the terminal screws 60.

The spring retainer 67 as shown more clearly in the exploded perspective view of FIG. 10 comprises a cup-shaped member having a pair of oppositely disposed lugs 72. The lugs 72 are adapted to engage the surface of a partition 74 formed in the terminal head 58 but adapted upon manual rotation of the spring retainer 67 to pass through suitable complemental slots 77 to permit removal of the thermometer unit 18 from the well assembly.

Referring now to the specific construction and method of manufacturing the thermometer unit 18 the assembly as shown more clearly in FIGS. 3 and 4 is comprised essentially of 4 parts, namely, a leadwire tube 76, a sensing element tube or sheath 78, an insulator 80 in which the resistance elements 44 and 46 are mounted, and a protective sleeve 82 for the leadwires.

The leadwire tube 76 is formed in standard stock lengths by inserting a plurality of (in this case four) bare leadwires 84, 86, 88 and 90 of nickel or other material in the tube 76 and then filling the tube with an insulating material 91 such as powdered magnesium oxide. The tube is then swaged to a reduced diameter causing the oxide powder to become compressed and packed firmly around the bare leadwires effecting complete electrical insulation thereof. When it is desired to make a thermometer unit, a tube 76 of the desired length is cut from the stock material and trimmed to provide short portions of the leadwires 84, 86, 88 and 90 projecting at each end thereof as illustrated more clearly in FIG. 3.

At the left end of the tube 76, the powdered oxide material is removed by means of a suitable pointed tool and an insulator 92 having 4 spaced holes corresponding to the spacing of the leadwires 84, 86, 88 and 90 is inserted in the end of the tube 76 in place of the withdrawn material. The purpose of the insulator 92 is to provide a rigid insulating support for the leadwires at the left end of the tube 76 and to prevent possible loosening and loss of the powdered oxide material.

At the right end of the leadwire tube 76, suitable insulation covered conductors 94, 96, 98 and 100 are connected such as by welding to the projecting ends of the bare leadwires 84, 86, 88 and 90 respectively and extend for connection to the terminal screws 60. Upon connection of the insulation covered leadwires to the bare leadwires in the manner described the protecting sleeve 82 is fitted over the right end of the tube 76 and is welded thereto to become an integral part thereof as shown in FIG. 4.

It will be apparent that tube 76 may be cut from a stock tube to any desired length and thus may be appropriately fabricated to accommodate any length of the well 52 or pipe nipple 56 without inconvenience in the assembly process.

Referring now to the sensing element tube or sheath 78, as shown most clearly in FIGS. 3 and 4, this part comprises a metal tube of tapering diameter the right end of which is adapted to be fitted over the left end of the leadwire tube 76 and welded thereto as indicated in FIG. 4. The left end of the sensing element tube 78 is sealed by a metal plug 102 which may be forced fitted or welded in the end of the sensing element tube 78.

The cylindrical insulator 80 (FIGS. 5, 6, 7, 8 and 9) is formed from ceramic or other suitable insulating material capable of withstanding high temperature conditions and is adapted to be positioned within the sensing element tube 78. In general the insulator 80 provides support for the two resistance elements 44 and 46 which are positioned interiorly thereof.

The insulator 80 is provided with 4 spaced longitudinal bores 104, 106, 108 and 110 slightly larger in diameter than the helical resistance elements 44 and 46. The resistance elements 44 and 46 are positioned within the bores 106 and 110 respectively while a pair of supporting wires 112 and 114 extend through the bores 104 and 108 respectively. The left end of the insulator 80 is bevelled on opposite sides thereof at the end of the bores 104 and 108. The ends of the supporting wires 112 and 114 extend from the bores 104 and 108 and are bent over against the bevelled surfaces respectively as shown more clearly in FIGS. 6 and 8 to inhibit movement of the insulator 80 to the left relative to the wires 112 and 114.

At the right end of the insulator 80 suitable abutments 116 and 118 larger in diameter than the bores 104 and 108 are fixed to the supporting wires 112 and 114 to inhibit movement of the insulator 80 to the right. With this arrangement displacement of the insulator 80 in either direction relative to the supporting wires 112 and 114 is prevented.

At the left end of the insulator 80 the ends of the resistance elements 44 and 46 are electrically connected as shown more clearly in FIG. 5 while the right ends of said resistance elements are connected by short leadwires 120 and 122 to the abutments 116 and 118, the necessary electrical connections being effected by welding or brazing. To complete the assembly of the unit 18 the supporting wires 112 and 114 are welded or brazed to the leadwires 84 and 90 as illustrated in FIG. 4 and the leadwires 86 and 88 are similarly welded or brazed to the leadwires 84 and 90 to complete the electrical circuit illustrated schematically in FIG. 1.

The spaces within the sensing element tube 78 and insulator 80 are also preferably filled with a powdered insulating material such as aluminum oxide as illustrated in FIG. 4. This material provides a cushioning effect and facilitates electrical insulation of the circuit elements insuring proper operation of the unit 18 during conditions of extreme vibration and temperature.

In the assembly of the complete thermometer unit 18, the leadwire tube 76 is first cut from stock material and provided with the insulator 92 in one end thereof as previously described. The spring retainer 68 is attached by welding to the periphery of the tube 76. The insulation covered conductors are then attached to the bare leadwires extending from the leadwire tube 76 and protective sleeve 82 is attached by welding to the end of the leadwire tube. Next the wire resistance elements 44 and 46 and supporting wires 112 and 114 are positioned in the bores of the insulator 80 and the wires 112 and 114 are each bent at one end and provided with abutments 116 and 118 at the other end thereof. Subsequently the various brazed or welded connections of the leadwires, resistance wires and supporting wires are made.

After completing the above described assembly of the insulator 80 to the leadwire tube 76, the sensing element tube 78 is fitted over the end of the leadwire tube 76 and welded thereto as shown in FIG. 4. Following this operation the sensing element tube 78 is filled from the left end thereof with aluminum oxide powder which fills the various spaces around the insulator 80 and resistance elements 44 and 46. The plug 102 is then pressed into the left end of the tube 78 to seal the end of the thermometer unit. The right end of the protective sleeve 82 is filled with a silicon resin or other suitable material which will prevent moisture from entering and being absorbed in the magnesium oxide powder of the leadwire tube 76.

The advantages of the invention will now be apparent. The unique support of the insulator 80 within the tube 78 prevents longitudinal displacement of the insulator and the creation of stress on the resistance elements 44 and 46 due to such movement. The provision of the hard ceramic insulator 80 however renders the manufacture and assembly process relatively simple and eliminates the need for swaging the tube 78 to pack the insulating material so as to fix the position of the resistance elements. The loosely packed insulating powder filling the bores of the insulator 80 however provides the necessary additional insulating medium and provides the necessary cushioning effect when the thermometer unit 18 is subject to vibrational forces. Additionally the powdered insulating material provides good thermal conductivity between the resistance elements 44 and 46 and tube 78.

While only one embodiment of the invention has been herein shown and described, it will be apparent to those skilled in the art that many changes may be made in the construction and arrangement of parts without departing from the scope of the invention as defined in the appended claims.

What I claim as new and desire to obtain by Letters Patent of the United States is:

1. A resistance thermometer unit comprising a hollow supporting well adapted to be mounted in the wall of an enclosure the internal temperature of which is to be measured, a swaged metal leadwire tube filled with compressed powdered insulating material and having electric leadwides extending therethrough in insulated relationship, said leadwire tube being cut from swaged stock tubing to a length dependent on the desired over-all length of the resistance thermometer, a cylindrical shaped ceramic insulator having four spaced longitudinal bores therein and having a fixed predetermined length irrespective of the length of the resistance thermometer and said leadwire tube, a pair of helical wire resistance elements positioned in two of said bores respectively and electrically connected to at least two of said leadwires, a pair of supporting wires extending through the other two of said bores respectively, a bend at one end of each of said supporting wires for preventing displacement of said insulator relative to said supporting wires in one direction, abutment means at the other end of each of said supporting wires for preventing displacement of said insulator in the other direction, a tubular metal sheath enclosing said insulator having one end fitted over the end of said metal leadwire tube and fixed thereto to define a sealed unit, said sheath having a fixed predetermined length irrespective of the length of the resistance thermometer and said leadwire tube, said sealed unit being slideably received in said well, a powdered insulating material filling the spaces within said sealed unit to insure electrical isolation of the electrically conductive parts and to provide a soft supporting medium for said resistance elements, a spring retainer fixed to said leadwire tube, and a coil spring encircling said leadwire tube and mounted in compression between said retainer and said well to bias said sealed unit toward the end of said well.

2. The method of making sealed resistance thermometer units of varying desired length utilizing random stock lengths of leadwire tubing having electrical leadwires extending therethrough insulated by powdered insulating material compressed during swaging of the tubing, which includes the steps of cutting predetermined lengths of the swaged tubing corresponding to desired lengths of the thermometer units, mounting thermally responsive resistance elements ceramic insulators of cylindrical configuration and of fixed predetermined length, electrically connecting the resistance elements to leadwires of the leadwire tubes, fitting each insulator and one end of the leadwire tube in a metal sheath of fixed predetermined length, welding the tube to one end of the sheath, attaching insulation covered conductors to the leadwires at the other end of the leadwire tubes, filling each sheath from the other end thereof with powdered insulating material, and sealing said other end of each sheath.

References Cited in the file of this patent

UNITED STATES PATENTS

| | | |
|---|---|---|
| 1,359,400 | Lightfoot | Nov. 16, 1920 |
| 1,463,005 | Dalton | July 24, 1923 |
| 2,131,065 | Obermaier | Sept. 27, 1938 |
| 2,465,981 | Robertson | Mar. 29, 1949 |
| 2,769,140 | Obenshain | Oct. 30, 1956 |
| 2,890,429 | Baker | June 9, 1959 |